Figure 1:
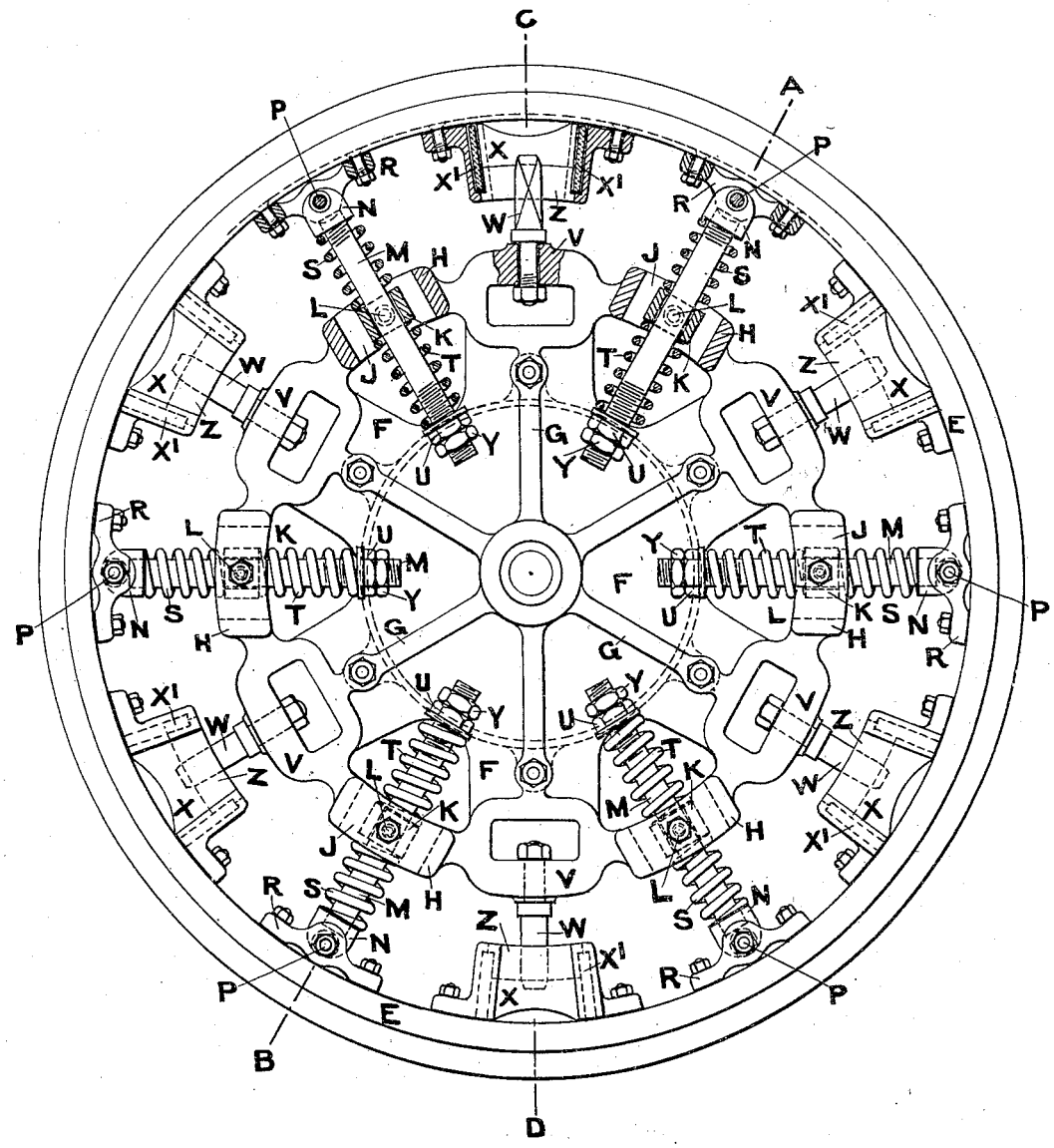

No. 863,206. PATENTED AUG. 13, 1907.
T. OLDFIELD & J. A. SCHOFIELD.
RESILIENT WHEEL FOR MOTOR CARS AND OTHER ROAD VEHICLES.
APPLICATION FILED JULY 27, 1906.

2 SHEETS—SHEET 1.

No. 863,206. PATENTED AUG. 13, 1907.
T. OLDFIELD & J. A. SCHOFIELD.
RESILIENT WHEEL FOR MOTOR CARS AND OTHER ROAD VEHICLES.
APPLICATION FILED JULY 27, 1906.
2 SHEETS—SHEET 2.
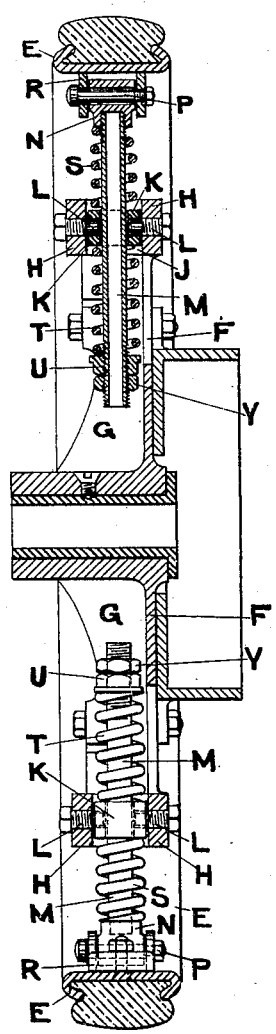
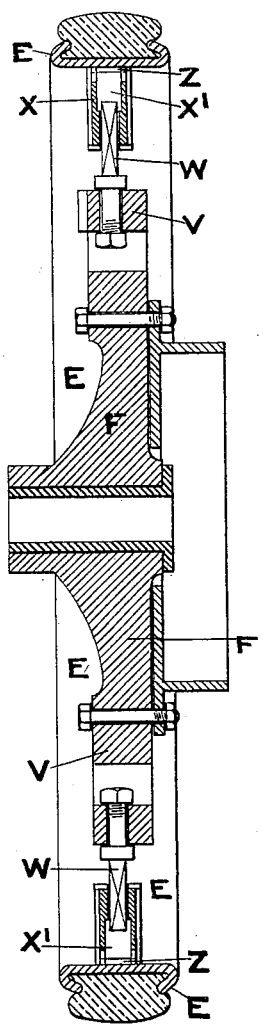
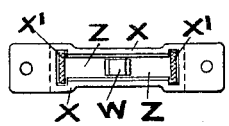
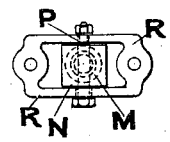
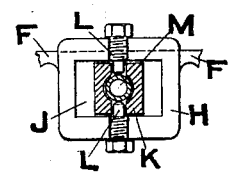
WITNESSES
INVENTORS

UNITED STATES PATENT OFFICE.

TOM OLDFIELD AND JOSEPH ARTHUR SCHOFIELD, OF HALIFAX, ENGLAND.

RESILIENT WHEEL FOR MOTOR-CARS AND OTHER ROAD-VEHICLES.

No. 863,206.  Specification of Letters Patent.  Patented Aug. 13, 1907.

Application filed July 27, 1906. Serial No. 328,068.

*To all whom it may concern:*

Be it known that we, TOM OLDFIELD and JOSEPH ARTHUR SCHOFIELD, subjects of the King of Great Britain, residing at Halifax, in the county of York, England, whose postal address is Central Iron Works, Boothtown, Halifax aforesaid, have invented certain new and useful Improvements in Resilient Wheels of Motor-Cars and other Road-Vehicles, of which the following is a specification.

Our invention relates to resilient or spring wheels for motor cars and other suitable road vehicles, such as are constructed with two concentric rims, or with an extended hub and outer rim or tire having laminated, curved, or other springs interposed, and our object is, primarily, to construct such wheels so that while the relative movements of the outer rim and inner rim or hub in any direction in opposition to the springs is permitted, the springs cushion or absorb all shocks imparted to the outer rim or tire when traveling over an uneven surface, and prevent the same being transmitted to the vehicle body. Further, the springs are arranged and operate in such a manner that whatever the relative displacement of the centers of the hub and outer rim, the elasticity or yielding resistance set up by said springs, is uniform or equal upon diametrically opposite sides throughout the circumference of the wheel, giving a better balance and greater efficiency to said wheel. Also, when the outer rim takes the drive, the forces acting upon the hub are simultaneously transmitted equally to diametrically opposite sides of the rim throughout its circumference, and the drive rendered gradual by means of swivel nuts, pivoting upon the hub portion, sliding upon pivoted retaining bolts or tubes and more or less compressing the springs in manner aforesaid, until the resistance of the said springs overcomes the resistance of the outer rim.

Should the forces exerted be violent, or the resistance greater than that of the springs, the continued independent movement of the hub portion after compression is arrested, and the drive transmitted by radial bolts secured to the hub portion, coming in contact with one end of a slot in guide boxes secured to the outer rim, according to the direction of motion, and rubber cushions placed within said slots reduce the shock or force of impact to a minimum. These bolts and guide boxes or brackets also serve to prevent lateral shifting of the two rims, or outer rim and hub portion.

The springs of the cushioning device may be adjusted as to tension, according to the load of the vehicle, and having only one action, a compressive action, they are not liable to frequent breakage but serve for an indefinite period.

In this manner we produce a cheap, silent, and efficient spring or resilient wheel constructed and arranged so that should any portion of the cushioning device need renewing, it can easily and quickly be taken out and replaced.

Similar letters refer to similar parts throughout the several views in which

Figure 1 is a side elevation partly in section of our improved resilient or spring wheel suitable for motor cars and other road vehicles. Fig. 2 is an end elevation in section through the line A. B. of Fig. 1. Fig. 3 is a similar view through the line C. D, of Fig. 1. Fig. 4 is a plan view of guide box or lug for preventing lateral shifting of the outer rim and hub portions and transmitting the drive, showing position of radial bolt or stud, and means for buffering same. Fig. 5 is a similar view of rim bracket, to which is hinged or pivoted the rocking arm or link and retaining bolt of the cushioning device. Fig. 6 is a sectional plan of swivel nut and means for supporting same within or upon the hub portion. Fig. 7 is a view of pivot stud for supporting the swivel nut aforesaid. Fig. 8 is a sectional view of rocking arm or link to which is attached the retaining bolts.

In constructing resilient wheels in accordance with our invention we preferably employ an outer rim or tire E concentrically about an inner rim, or extended or flanged hub F of special design, the latter being preferably formed of aluminium or aluminium alloy to insure lightness. This inner rim or hub portion F may have radial arms or ribs G for strengthening purposes, while upon or near its outer edge or rim are a number of projections or lugs H, within each of which is a suitable recess or slot J. Within each recess is a bush, nut, or sleeve K supported and made to swivel within said recess by pivot bolts L screwed into and projecting from each side of lugs or projections.

A radial retaining bolt, rod, or tube M of a suitable length and screwed at each end, passes loosely through each swivel nut or bush K, and is secured to or suspended from a rocking link or arm N pivoting at P upon a bracket R bolted to the outer rim E. Upon the retaining bolts or tubes M are mounted two spiral or the like springs, one spring S is placed between the rocking arm or link N and the swivel nut K, and the other spring T between the swivel nut and a disk nut U screwed upon the other end of retaining bolt. In this manner whatever the direction of displacement of the rim or hub centers, compression or cushioning of one or other of the springs is the result.

Interposed between the aforesaid projections or lugs H, is another series of projections V carrying radial bolts or studs W which project within a corresponding number of guide boxes, lugs, or brackets X attached to the inner side of the outer rim or tire E. These bolts or studs and guide boxes are radially situated and are for preventing lateral shifting of the rims, and under certain circumstances serve to transmit the drive to the outer rim.

When all the forces are in equilibrium, the position of the various parts are as shown at Fig. 1, but upon the wheel being loaded there is a more or less displacement of the centers of the outer rim and hub portions causing one of the springs upon each retaining bolt or tube to contribute more or less to the cushion of the outer rim or hub portion as the case may be, the compression of the outer spring S upon one tube is simultaneously followed by a corresponding compression of the inner spring T upon the tube diametrically opposite, throughout the circumference of the wheel. This compression of the springs and cushioning of the hub or rim portions is accomplished by reason of the particular manner in which the hub portion F is mounted within the outer rim E. Any radial movement of the hub or outer rim causes the retaining bolts M to oscillate upon their pivots P, and the nuts k to move more or less along the said bolts according to their relative positions and the amount and direction of the forces acting upon the wheel. The movements of the nuts K upon the bolts M compress in a corresponding degree one or other of the spirngs S, T, upon each side, and each of these springs absorbs more or less the vibration or shock accordingly.

By tightening up the nuts U and lock-nuts Y upon the bolts M, the tension of the springs may be varied according to the load upon the wheel. The retaining bolts M and swivel nuts K in combination with the springs S, T, also serve to gradually transmit the drive to the outer rim E, as, immediately a rotary movement is imparted to the hub portion F, the same oscillation and movement of the parts M K and springs S, T, again take place, conforming to the strain put upon them, and continuing until the resistance of the springs overcomes that of the outer rim or tire E when the latter immediately takes the drive.

In case the weight of the vehicle, obstructions to the outer rim, or other causes, overcome the resistance of the springs, the rotary movement of the hub portion and the movement of the nuts K along the retaining bolts M continue until the radial bolts W come in contact with the ends of slots Z in the guide boxes X; these bolts W operate to overcome any further resistance of the outer rim, and so impart the drive or motion to the vehicle.

X¹ are rubber blocks placed at each end of the slots Z for cushioning the impact of the bolts W against the end of said slots when transmitting the drive as before described. In this manner there is no shock or jerk when starting the vehicle, as the strain is imparted to the outer rim or tire gradually, and the free movement of the hub portion upon the retaining bolts enables the vibration to be distributed and absorbed in a circumferential manner so that its communication to the vehicle body is reduced to a minimum.

All the parts are simple, convenient, durable, and can be easily and quickly taken out and replaced. The wheel is as silent and resilient in action as one mounting pneumatic tires.

What we claim as our invention and desire to secure by Letters Patent is:—

1. In a wheel, the combination, with an outer rim, and an inner or hub portion; of sleeves pivoted to the said inner portion, normally radial bars having their middle portions slidable in the said sleeves and their outer ends pivotally connected with the said rim, abutments secured on the end portions of the said bars, and helical springs arranged between the ends of the said sleeves and the said abutments.

2. In a wheel, the combination, with an outer rim, and an inner or hub portion; of sleeves pivoted to the said inner portion, normally radial bars having screwthreaded portions at each end and having their middle portions slidable in the said sleeves, abutment blocks screwed on the outer ends of the said bars and pivotally connected with the said rim, abutment nuts screwed on the inner ends of the said bars, and helical springs arranged between the ends of the said sleeves and the said abutment blocks and abutment nuts respectively.

3. In a wheel, the combination, with an outer rim, and an inner or hub portion; of guides secured to one of the said parts, guide bars secured to the other said part and slidable radially and circumferentially in the said guides, sleeves pivoted to the said inner portion, normally radial bars having their middle portions slidable in the said sleeves and their outer ends pivotally connected with the said rim, abutments secured on the end portions of the said bars, and helical springs arranged between the ends of the said sleeves and the said abutments.

4. In a wheel, the combination, with an outer rim, and an inner or hub portion; of guides secured to one of the said parts and provided with spring buffers, guide bars secured to the other said part and slidable radially and circumferentially in the said guides and engaging with the said buffers, and spring-controlled driving-connections operatively connecting the two said parts of the wheel together.

In testimony whereof we affix our signatures, in presence of two witnesses.

TOM OLDFIELD.
JOSEPH ARTHUR SCHOFIELD.

Witnesses:
ABM. REED,
W. H. KENNARD.